(12) United States Patent
Dunjic et al.

(10) Patent No.: US 12,450,582 B2
(45) Date of Patent: *Oct. 21, 2025

(54) ENABLING FEATURE BASED ON A SENSED CONDITION AT AMBIENT COMMERCE PREMISES

(71) Applicant: The Toronto-Dominion Bank, Toronto (CA)

(72) Inventors: Milos Dunjic, Oakville (CA); David Samuel Tax, Toronto (CA); Jonathan Joseph Prendergast, West Chester, PA (US); Asad Joheb, Toronto (CA); Christopher Mark Jones, Villanova, PA (US); Thomas Osman Kelly, Wenonah, NJ (US)

(73) Assignee: The Toronto-Dominion Bank, Toronto (CA)

( * ) Notice: Subject to any disclaimer, the term of this patent is extended or adjusted under 35 U.S.C. 154(b) by 544 days.

This patent is subject to a terminal disclaimer.

(21) Appl. No.: 17/682,776

(22) Filed: Feb. 28, 2022

(65) Prior Publication Data

US 2023/0274247 A1    Aug. 31, 2023

(51) Int. Cl.
*G06Q 20/20* (2012.01)
*G06Q 20/40* (2012.01)

(52) U.S. Cl.
CPC ....... *G06Q 20/202* (2013.01); *G06Q 20/4015* (2020.05)

(58) Field of Classification Search
CPC ............ G06Q 20/202; G06Q 20/4015; G06Q 20/208; G06Q 40/03; G06Q 30/0207; G06Q 30/0623; G06Q 30/0639

(Continued)

(56) References Cited

U.S. PATENT DOCUMENTS 8,589,238 B2   11/2013   Cooper et al.
10,043,171 B2   8/2018   Maenpaa
(Continued)

FOREIGN PATENT DOCUMENTS

JP   4243396 B2 *  3/2009   .......... G06Q 20/208
WO   2014011691      1/2014
(Continued)

OTHER PUBLICATIONS

Belsie, Laurent. Why traditional retailers have the checkout blues. The Christian Science Monitor; Boston, Mass. Dec. 14, 2020. (Year: 2020).*

(Continued)

*Primary Examiner* — Fawaad Haider
(74) *Attorney, Agent, or Firm* — Rowand LLP (57) ABSTRACT

According to an aspect there is provided an ambient commerce system. The ambient commerce system may include a sensor at an ambient commerce premises. The ambient commerce system may further include a processor coupled to the sensor and a memory coupled to the processor. The memory may store processor-executable instructions which, when executed, cause the processor to: detect, based on an output of the sensor at the ambient commerce premises, engagement of an entity with a first item satisfying first predetermined criteria; identify the entity; determine based on account data for the identified entity, a resource parameter for the identified entity; and when the resource parameter satisfies second predetermined criteria, generate a notification on an electronic device associated with the entity. Identifying the entity may include image recognition, such as facial recognition.

17 Claims, 8 Drawing Sheets

(58) Field of Classification Search
USPC .......................................................... 705/21
See application file for complete search history.

(56) References Cited

U.S. PATENT DOCUMENTS

| | | | |
|---|---|---|---|
| 10,380,816 B2 | 8/2019 | Landers, Jr. et al. | |
| 10,445,715 B2 | 10/2019 | Granbery et al. | |
| 10,445,807 B1 | 10/2019 | Commons et al. | |
| 10,586,227 B2 | 3/2020 | Makhdumi et al. | |
| 10,600,049 B2 | 3/2020 | Qian et al. | |
| 10,733,599 B2 | 8/2020 | Ghosh et al. | |
| 10,748,001 B2 | 8/2020 | Abhishek et al. | |
| 10,810,592 B1 | 10/2020 | Omojola et al. | |
| 10,853,851 B2 | 12/2020 | Shah | |
| 10,909,562 B2 | 2/2021 | Roeding et al. | |
| 10,929,867 B1 | 2/2021 | Joseph et al. | |
| 10,997,420 B2 | 5/2021 | Abhishek et al. | |
| 11,010,764 B1 | 5/2021 | Mimassi | |
| 11,017,401 B1 | 5/2021 | Mimassi | |
| 11,030,603 B1 | 6/2021 | Asefi et al. | |
| 11,030,604 B2 | 6/2021 | Kambara et al. | |
| 11,042,902 B2 | 6/2021 | Lee | |
| 11,100,490 B1 | 8/2021 | Doyle et al. | |
| 11,182,803 B2 | 11/2021 | Budano et al. | |
| 11,423,476 B1 * | 8/2022 | Kim | G06N 20/00 |
| 2005/0137987 A1 | 6/2005 | May et al. | |
| 2008/0265020 A1 | 10/2008 | Copeland et al. | |
| 2011/0316697 A1 * | 12/2011 | Krahnstoever | G08B 13/19682 382/190 |
| 2012/0271712 A1 | 10/2012 | Katzin et al. | |
| 2013/0254115 A1 | 9/2013 | Pasa et al. | |
| 2015/0012358 A1 | 1/2015 | Almendras | |
| 2015/0085111 A1 | 3/2015 | Lavery | |
| 2015/0227938 A1 | 8/2015 | Smets et al. | |
| 2016/0005038 A1 | 1/2016 | Kamal et al. | |
| 2017/0148005 A1 | 5/2017 | Murn | |
| 2017/0372401 A1 | 12/2017 | Wang et al. | |
| 2019/0005530 A1 | 1/2019 | Greenberger et al. | |
| 2019/0259014 A1 | 8/2019 | Katayama et al. | |
| 2020/0110944 A1 | 4/2020 | Kakino | |
| 2020/0118400 A1 * | 4/2020 | Zalewski | H04W 76/14 |
| 2020/0250736 A1 | 8/2020 | Howard et al. | |
| 2021/0056580 A1 | 2/2021 | Walker | |
| 2021/0117656 A1 | 4/2021 | Garcia | |
| 2021/0182921 A1 | 6/2021 | Onkels et al. | |
| 2021/0374707 A1 * | 12/2021 | Sartori | G06Q 20/204 |

FOREIGN PATENT DOCUMENTS

| | | |
|---|---|---|
| WO | 2019168762 | 10/2019 |
| WO | 2020075837 | 4/2020 |
| WO | 2021220714 | 4/2021 |

OTHER PUBLICATIONS

Unknown. A System and Method to Enhance End-to-End Shopping Experience in Retail. IP.com Prior Art Database, 2021. (Year: 2021).*

Wankhede, Kirti et al. Just Walk-Out Technology and its Challenges: A Case of Amazon Go. 2018 International Conference on Inventive Research in Computing Applications, 2018. (Year: 2018).*

USPTO; Final Office Action relating to U.S. Appl. No. 17/684,743 dated Apr. 24, 2024.

Zippin Platform Reader, Zippin's checkout-free technology platform is fast to deploy, highly accurate, and will delight your customers; Published in Zippin; retrieved Dec. 3, 2021.

* cited by examiner

ENABLING FEATURE BASED ON A SENSED CONDITION AT AMBIENT COMMERCE PREMISES

TECHNICAL FIELD

The present application relates to ambient commerce systems and, more particularly, to systems and computer-implemented methods to provide notifications based on a sensed condition at an ambient commerce premises and systems and computer-implemented methods to enable a feature based on a sensed condition at an ambient commerce premises.

BACKGROUND

Ambient commerce systems are sometimes deployed at an ambient commerce premises such as a store to allow customers to skip a traditional checkout process. Often, a customer will tap a credit card or app at a reader when they enter a store and the ambient commerce system monitors which items the customer leaves the store with and then automatically processes a payment for such items. Ambient commerce systems offer a cashier-less checkout experience. In this way, a customer does not have to participate in a traditional checkout process—they simply walk out of the store with any items that are to be purchased.

Ambient commerce systems offer numerous benefits including, for example, reducing the possibility of theft, increasing the speed of checkout, and reducing human resource requirements. However, ambient commerce systems are often limited in features and functionality and thus there is a need for improvements in such systems.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

According to an aspect there is provided an ambient commerce system. The ambient commerce system may include a sensor at an ambient commerce premises. The ambient commerce system may further include a processor coupled to the sensor and a memory coupled to the processor. The memory may store processor-executable instructions which, when executed, cause the processor to: detect, based on an output of the sensor at the ambient commerce premises, engagement of an entity with a first item satisfying first predetermined criteria; identify the entity; determine based on account data for the identified entity, a resource parameter for the identified entity; and when the resource parameter satisfies second predetermined criteria, generate a notification on an electronic device associated with the entity.

Conveniently, in this way a relevant notification may be displayed based on a sensed condition while an entity is engaged in ambient commerce.

In some implementations, engagement of the entity with the first item may be detected by detecting a dwell of an entity in a geofence for the first item. The notification may be generated on the electronic device associated with the entity while the entity remains in the geofence for the first item.

In some implementations, the first predetermined criteria may be determined to be satisfied if a value parameter for the first item exceeds a defined threshold.

In some implementations, the first predetermined criteria may be determined to be satisfied when a class parameter associated with the first item corresponds to a defined class.

In some implementations, the resource parameter may indicate access to a borrowed resource. The second predetermined criteria may be determined to be satisfied when the resource parameter indicates that the entity has access to a borrowed resource.

In some implementations, the resource parameter may indicate a resource balance. The second predetermined criteria may be determined to be satisfied when the resource parameter indicates that the resource balance exceeds a threshold.

In some implementations, the threshold may be determined based on a value parameter for the first item.

In some implementations, the instructions may further cause the processor to: identify, from an item mapping database and based on the first item, a second item. The notification may identify the second item.

In some implementations, the second item may be an alternative to the first item.

In some implementations, the second item may be an accessory for the first item.

In some implementations, the sensor may be a gaze detection sensor.

In another aspect, a computer-implemented method is provided. The computer-implemented method includes: detecting, based on an output of a sensor at an ambient commerce premises, engagement of an entity with a first item satisfying first predetermined criteria; identifying the entity; determining based on account data for the identified entity, a resource parameter for the identified entity; and when the resource parameter satisfies second predetermined criteria, generating a notification on an electronic device associated with the entity.

In some implementations, engagement of the entity with the first item may be detected by detecting a dwell of an entity in a geofence for the first item. The notification may be generated on the electronic device associated with the entity while the entity remains in the geofence for the first item.

In some implementations, the first predetermined criteria may be determined to be satisfied if a value parameter for the first item exceeds a defined threshold.

In some implementations, the first predetermined criteria may be determined to be satisfied when a class parameter associated with the first item corresponds to a defined class.

In some implementations, the resource parameter may indicate access to a borrowed resource and wherein the second predetermined criteria is determined to be satisfied when the resource parameter indicates that the entity has access to a borrowed resource.

In some implementations, the resource parameter may indicate a resource balance. The second predetermined criteria may be determined to be satisfied when the resource parameter indicates that the resource balance exceeds a threshold.

In some implementations, the threshold may be determined based on a value parameter for the first item.

In some implementations, the method may further include: identifying, from an item mapping database and based on the first item, a second item. The notification may identify the second item.

In some implementations, the second item may be an alternative to the first item.

In another aspect, there is provided a computer-readable storage medium. The computer-readable storage medium may be a non-transitory computer-readable storage medium. The computer-readable storage medium may have stored thereon instructions which, when executed, configure a processor and/or a computer system to perform a method described herein.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

Systems and methods for providing identity data to remote computer systems using a payment network are described below.

Figure 1:
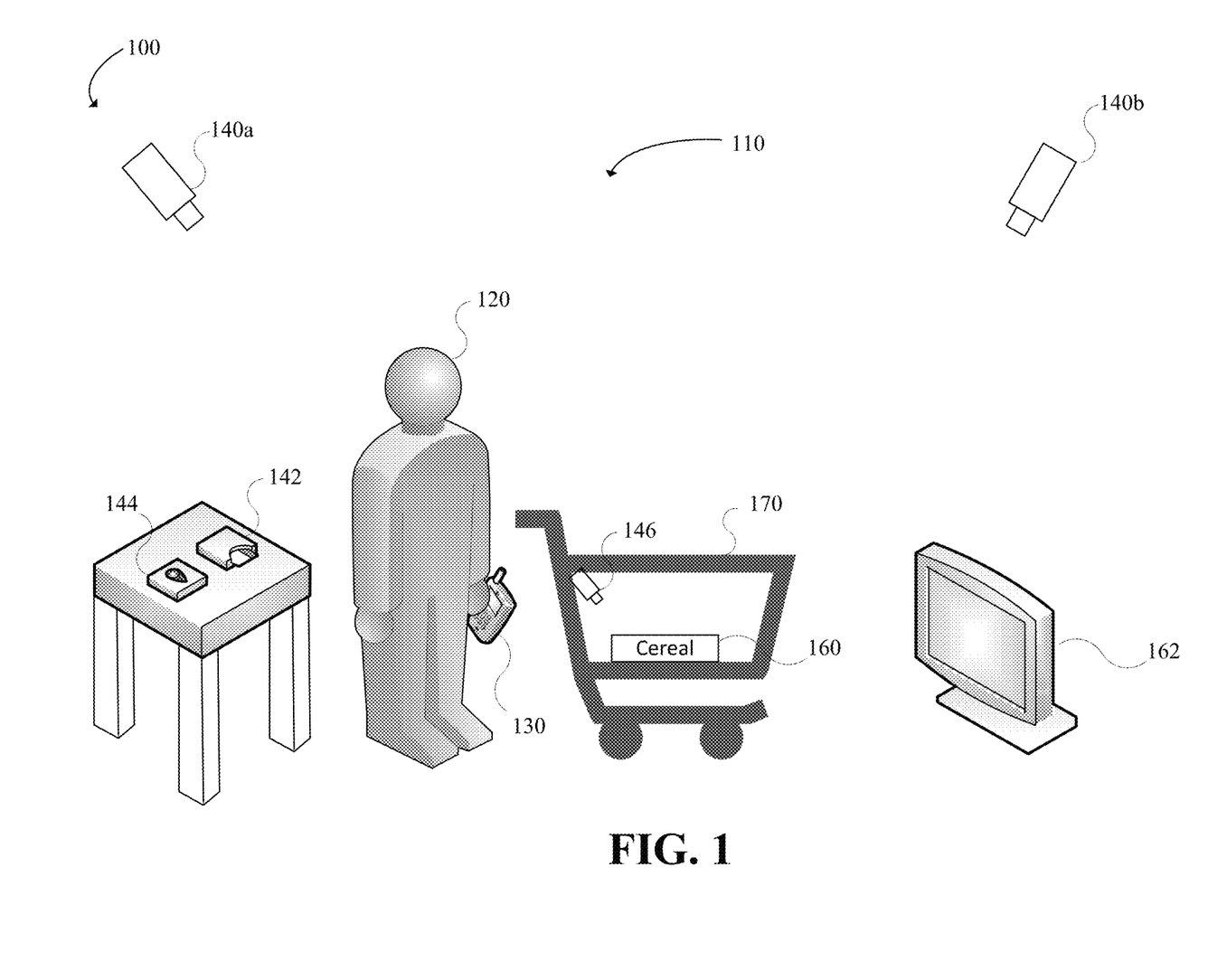
FIG. 1 is a plan view of an ambient commerce system at an ambient commerce premises illustrating an operating environment of an example embodiment.

FIG. 1 is a plan view of an ambient commerce system 100 at an ambient commerce premises 110. The ambient commerce premises 110 may be a merchant location such as a store. The store may be a bricks-and-mortar establishment at which a customer may physically attend to shop. By way of example, the store may be or include any one or more of a grocery store, a department store, a clothing store, a thrift shop, a sporting goods store, a big box store, a pet store, a discount store, a warehouse store, a convenience store, or a store of another type.

The ambient commerce system 100 may be referred to as a cashier-less checkout system, an ambient checkout system, a "just-walk-out" system or "grab and go" system. The ambient commerce system 100 includes one or more sensors which are used by the ambient commerce system to identify one or more items 160, 162 that are sold by at the ambient commerce premises 110 and that are being purchased by an entity 120 such as a customer who is on site at the ambient commerce premises 110.

The items may be or include any products. By way of example, the items 160, 162 that are available for purchase via the ambient commerce system 100 may be or include groceries, electronic goods, sporting goods, accessories, clothing, or goods of another type.

The ambient commerce system 100 may include various sensors. The sensors may generate respective sensor outputs which are used by the ambient commerce system 100 to facilitate ambient commerce. For example, the sensors may be or include one or more cameras 140a, 140b. The cameras may be located at various regions throughout the ambient commerce premises 110. In some implementations, the cameras 140a, 140b are part of a camera array or camera grid. The camera array or grid may provide complete or near complete coverage of all areas of the ambient commerce system 100 and the cameras may be configured to provide some overlap in camera coverage. In some implementations, each of the cameras may include multiple image sensors or the cameras may be configured in multiples such as pairs to enable the ambient commerce system 100 to determine and evaluate depth information as part of its analysis.

The sensors may include a receptacle contents detector 146. The receptacle contents detector 146 may be provided on or associated with a particular shopping receptacle 170. The particular shopping receptacle 170 is a container or other receptacle which may be used for holding or transporting goods while shopping. The particular shopping receptacle may, for example, be a shopping cart, shopping basket, shopping bag, or shopping bin.

The receptacle contents detectors 146 may be or include any one or more of: a camera, a barcode reader, a quick response (QR) code reader, a wireless tag reader such as a radio frequency identifier (RFID) reader or a sensor of another type.

In some implementations, one or more of the items that may be available for purchase may include a physical feature which facilitates identification of that item by one of the sensors. By way of example, the items may include a barcode which may be scanned by a barcode reader or camera, a QR code which may be scanned by a QR code reader or scanner, and/or a wireless tag such as an RFID tag.

The sensors included in the ambient commerce system 100 may include other types of sensors and readers including, for example, a biometric reader 144 and/or a token reader 142. The biometric reader 144 and/or the token reader 142 may be identity sensors. Identity sensors are sensors that are used to verify the identity of an entity 120. That is, identity sensors may be used to associate an entity 120 on the ambient commerce premises 110 with a profile or account.

The biometric reader 144 may be or include a fingerprint sensor, a facial recognition sensor, a retina scanner, or a sensor of another type. The token reader 142 may be a physical card reader such as a payment card reader including a credit card reader or debit card reader. In some implementations, the token reader 142 may be or include a near field communication (NFC) reader. The token reader 142 may be configured, in some implementations, to wirelessly read a token which may be stored on an electronic device 130 associated with an entity 120 or which may be stored on a physical card.

The sensors included in the ambient commerce system 100 may also include a microphone. The microphone may be used, for example, to verify the identity of an entity using a voiceprint. That is, the microphone may be used as an identity sensor.

The sensors included in the ambient commerce system 100 may be or include a gaze detection sensor. The gaze detection sensor may be or include one or more cameras. The gaze detection sensor may be an eye gaze detection sensor. The gaze detection sensor may be used to identify at item that the entity 120 is currently looking at. The gaze detection sensor may detect where the entity 120 is looking by identifying a portion of an ambient commerce premises 110 being looked at from an angular direction of a head and/or eyes. In some implementations, the gaze detection sensor may be configured to identify a gaze vector and an item may be identified if it is in a direction associated with the gaze vector.

The ambient commerce system 100 may be configured to detect the identity of an entity 120 and/or items 160, 162 that are being purchased using any one of a number of techniques. For example, in some implementations, identity may be detected using an identity sensor. For example, the biometric reader 144 and/or token reader 142 and/or one or more of the cameras 140a, 140b may be used to determine identity of an entity when the entity enters the ambient commerce premises 110. By way of example, in some implementations, upon entering the ambient commerce premises, the entity 120 may tap their electronic device at a token reader 142 which may then read a token from the electronic device which uniquely identifies the customer. In some implementations, multiple authentication techniques may be used to verify the identity of the customer. For example, the ambient commerce system may use two or more of: facial recognition; token acquisition and verification; retinal scanning; fingerprint scanning; and voiceprint scanning.

Further, in some implementations, identity of an entity 120 may be determined or verified using a shared secret such as a personal identification number (PIN) or secret code or phrase. The ambient commerce system 100 may include an input device for receiving input of the shared secret from an entity 120.

In some implementations, the ambient commerce system 100 may include or operate in cooperation with an electronic device 130 associated with an entity 120. The electronic device 130 may be a portable electronic device such as a smartphone, smartwatch or other wearable electronic device. The electronic device 130 may, in some implementations connect with the ambient commerce system 100 when it is within a geolocation or geofence associated with the ambient commerce system 100. For example, when the electronic device 130 is at the ambient commerce premises, it may connect with the ambient commerce system 100. Such communication may be performed via a long or short range communication protocol. In some implementations, the electronic device 130 may have an ambient commerce application stored thereon which is configured to enable the electronic device 130 to communicate with the ambient commerce system 100.

In at least some implementations, the electronic device 130 may be used to identity an entity 120. For example, the electronic device 130 may share its location (as determined from a location subsystem such as a GPS subsystem) with the ambient commerce system 100. The ambient commerce system 100 may determine that a particular entity 120 is on site at the ambient commerce premises when the location of that entity's electronic device is within a geofence defined for the ambient commerce premises. Additionally or alternatively, in some implementations the electronic device 130 may connect to the ambient commerce system 100 via a short range communication protocol such as NFC, Bluetooth™, WiFi, or a short range communication protocol of another type. In such implementations, the ambient commerce system may determine that a particular entity 120 is on site at the ambient commerce premises when the location of that entity's electronic device is in communication range of a short-range communication system associated with the ambient commerce premises.

In some implementations, the ambient commerce system 100 may use a biometric sensor associated with an entity's electronic device to further verify that a particular entity 120 is at the ambient commerce premises. For example, the ambient commerce system may, when the electronic device is determined to be on site, cause the electronic device to prompt the entity for input of a shared secret or a biometric such as a fingerprint. In this way, the ambient commerce system determines that the electronic device is on site and is being used by a particular entity 120. This may, for example, prevent a fraudster from circumventing the ambient commerce system by stealing another person's electronic device.

The electronic device 130 associated with an entity 120 may be used for other purposes instead of or in addition to identification and customer detection. For example, the electronic device 130 may include an output interface such as a display screen or speaker and the output interface may be used for outputting notifications generated by the ambient commerce system or by another system associated with the ambient commerce system.

In some implementations, the ambient commerce system 100 may output notifications on an electronic device 130 associated with an entity in response to detecting engagement of the entity with a first item satisfying predetermined criteria. Engagement may be detected based on the output of one or more of the sensors. By way of example, engagement may be detected when the ambient commerce system determines, based on the output of a sensor such as a camera 140a, 140b, that an entity has dwelled within a geofence associated with a first item. By way of further example, engagement with an item may be detected when the ambient commerce system determines, based on the output of a sensor such as a receptacle contents detector 146, that the item has been added to a shopping receptacle. By way of further example, engagement with an item may be detected based on gaze. For example, when the ambient commerce system determines that the entity is looking at the item, which may be determined from the output of a gaze detection sensor, it may determine that the customer is engaged with the item.

Figure 2:
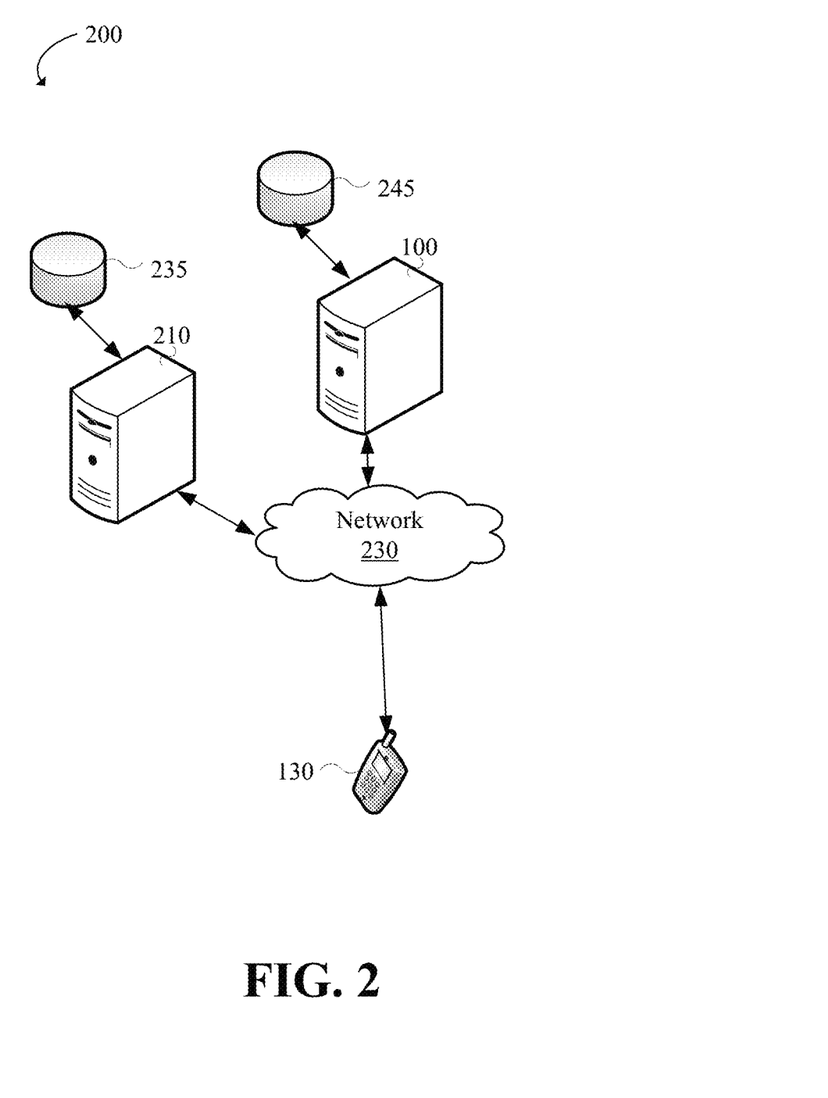
FIG. 2 is a schematic operation diagram illustrating an operating environment.

FIG. 2 is a schematic operation diagram illustrating an operating environment of an example embodiment. FIG. 2 illustrates a system 200 which may be or include an ambient commerce system 100. The ambient commerce system 100 may be of the type described above with reference to FIG. 1, or a variation thereof. The ambient commerce system 100 may be or include a computer system. The computer system may be coupled with one or more sensors, as described with reference to FIG. 1 and may receive sensor output from such sensors.

The system may also include an electronic device 130. The electronic device 130 may be as described above with reference to FIG. 1. The electronic device 130 may also be a computer system.

The electronic device 130 may be in communication with the ambient commerce system 100. Such communication may be via a direct connection or it may be an indirect connection. An indirect connection may be a connection that relies upon other intermediary computers or systems to relay messages. For example, as illustrated in FIG. 2, the ambient commerce system 100 and the electronic device 130 may be coupled to and communicate with one another via a network 230. The network 230 may be of various types. The network 230 may be a computer network. In some embodiments, the computer network may be an internetwork and may be formed of one or more interconnected computer networks. For example, the computer network may be or may include an Ethernet network, an asynchronous transfer mode (ATM) network, a wireless network, a telecommunications network or the like.

In some implementations, at least some communications between the electronic device 130 and the ambient commerce system 100 may occur over a direct connection. A direct connection may be a local communication method which may not require a network. For example, example direct connections include NFC, WiFi, and Bluetooth.

The ambient commerce system 100 may be or include a resource server 210. The resource server 210 may track, manage, and maintain resources, adjudicate lending requests, and/or lend resources for a plurality of entities. For example, resources available for a plurality of entities may be specified in account data for such entities. The resources may, for example, include computing resources, such as memory or processor cycles. By way of further example, the resources may include stored value, such as fiat currency, which may be represented in one or more databases. For example, as shown in FIG. 2, the resource server 210 may be coupled to a database 235, which may be provided in secure storage. The secure storage may be provided internally within the resource server 210 or externally; the secure storage may, for example, be provided remotely from the resource server 210. In some embodiments, the secure storage may include one or more data centers. The data centers may, for example, store data with bank-grade security.

The resource server 210 may include a resource request processing engine (not shown in FIG. 1). A resource request processing engine may be implemented to automatically process resource transfer requests that are received at a resource server. Specifically, the resource request processing engine may be configured to process requests to transfer resources that are associated with one or more resource accounts managed by the resource server. The resource request processing engine may process resource transfer requests in accordance with defined handling actions. For example, the resource request processing engine may be configured to automatically process resource transfer requests without manual intervention by related entities for the resource transfer requests.

The database 235 includes account data for a plurality of accounts associated with a plurality of entities. For example, the database 235 may include records for a plurality of accounts and at least some of the records may define a quantity of resources associated with an entity. For example, the entity that is associated with the electronic device 130 (which may also be referred to as a client device or customer device) may be associated with a resource account having one or more records in the database 235. The data records may reflect a quantity of stored resources that are associated with the entity. Such resources may include owned resources and, in at least some embodiments, borrowed resources (e.g., resources available on credit). The quantity of resources that are available to or associated with an entity may be reflected by a balance defined in an associated record such as, for example, a bank balance. In some implementations, a record for an account may be or include a resource parameter or enable the determination of a resource parameter. A resource parameter may, for example, indicate whether a particular entity associated with an account has access to a resource. In some implementations, the resource parameter may specify whether the particular entity associated with the account has access to a borrowed resource. In some implementations, the resource parameter may indicate a resource balance. The balance may be a balance associated with owned or borrowed resources.

The database 235 may also include identity verification data for entities having accounts in the database 235. The identity verification data may be or include a shared secret and/or biometric data such as a fingerprint, voiceprint and/or facial profile data. In at least some implementations, the resource server 210 may share at least some of the identity verification data with the ambient commerce system 100 to assist with verifying identity of an entity at an ambient commerce premises 110. In other implementations, rather than share the identity verification data itself, the resource server 210 may, instead, perform identity verification for the ambient commerce system and may confirm to the ambient commerce system the identity of an entity.

The resource server 210 may, for example, be a financial institution server and the entity associated with an electronic device 130 may be a customer of a financial institution operating the financial institution server.

The resource server 210 may be or include a computer system. The resource server 210 may be in communication with the ambient commerce system 100. In the illustrated example, the resource server 210 is in communication with the ambient commerce system 100 via the network 230.

As illustrated in FIG. 2, the ambient commerce system 100 may also include or be connected to a datastore 245 such as a database. The datastore 245 may be or include an inventory tracking data store. In some implementations, the datastore 245 may be or include an item mapping database. The item mapping database may associate a first item with a second item. The associated items may be, in some implementations, alternatives. By way of example, it may be that the first item is associated with a first brand and the second item is associated with a second brand. By way of further example, in some implementations, it may be that the second item is an accessory for use with the first item. In some implementations, the ambient commerce system 100 may generate notifications using the item mapping database. For example, when the ambient commerce system detects engagement of an entity with a first item, the ambient commerce system may use the item mapping database to identity a second item that is mapped to the first item and it may generate a notification on the electronic device 130 associated with that entity based on the second item.

The datastore 245 may include other product data instead of or in addition to the item mapping database. By way of example, the datastore 245 may include one or more parameters associated with items available at the ambient commerce premises 110. Such parameters may be referred to as item parameters. Example item parameters may be or include a value parameter and/or a class parameter. A value parameter may be an indicator of a cost or price of an item. Put differently, the value parameter for an item may represent an amount of resources required to transfer ownership of the item to an entity. The value parameter may, in some implementations, be expressed in units of currency, such as in dollars, Euros, Francs, etc.

A class parameter may define a category or classification that an item belongs to and it may also be referred to as a category parameter. The category may represent a type of the item. By way of example, example categories may include any one or a combination of: consumer electronics, televisions, sporting goods, bicycles, financeable products, clothing, grocery items, etc.

In some instances, a particular item may be associated with multiple class parameters. By way of example, an item may be associated with a broad class parameter that defines a broad category of the item (e.g., consumer electronic) and a narrow class parameter that defines a narrow category of the item (e.g., television). In some implementations, the class parameter(s) for an item may be or include a binary class parameter. A binary class parameter is a class parameter that operates as a flag which defines whether the item is or is not a particular type of good associated with that class parameter. By way of example, a binary class parameter may indicate whether an item is financeable. In some implementations, a financeable item may be an item that is available for purchase using a buy now pay later feature.

The class parameter(s) for an item may also be or include a brand parameter. A brand parameter indicates a brand associated with the item. The brand may be a manufacturer of the item. The brand may be a brand that is reflected on packaging associated with the item.

The datastore 245 or another datastore may also include item identification data. The item identification data may be data that is used by the ambient commerce system to identify an item in the ambient commerce premises. By way of example, in a system that relies upon a code such as a barcode or QR code for identification of items, the item identification data may include a representation of the code for a particular item. By way of further example, in a system which relies upon packaging identification, the item identification data may include information about the packaging of an item. By way of further example, in a system that relies upon in-store placement information to identify items, the item identification data may include information defining a location within the ambient commerce premises at which a particular item is located. By way of example, the in-store placement information may specify an aisle number, region number, shelf number, etc. and such numbers (or other identifiers) may be known to the ambient commerce system so that the ambient commerce system is able to identify the particular items available at various regions of the ambient commerce premises.

By way of further example, in a system which relies upon a tag such as an RFID tag, the item identification data may specify a number or other identifier associated with the tag.

Figure 3:
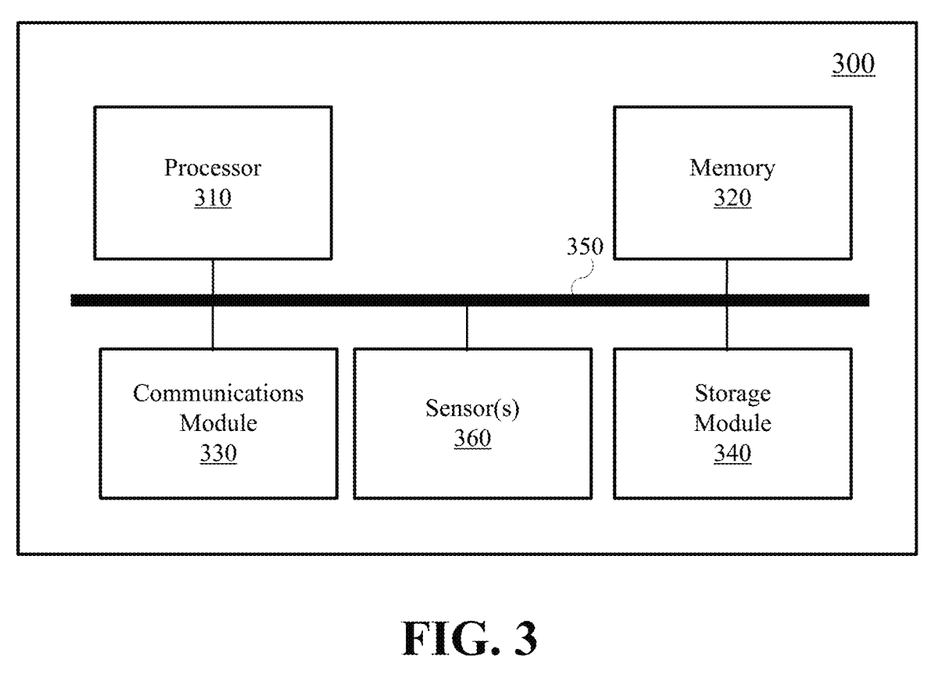
FIG. 3 is a high-level schematic diagram of an example computer device.

Referring now to FIG. 3, a high-level operation diagram of an example computer device 300 is shown. In some embodiments, the computer device 300 may be exemplary of one or more of the ambient commerce system 100, the electronic device 130 and/or the resource server 210.

The example computer device 300 includes a variety of modules. For example, as illustrated, the example computer device 300 may include a processor 310, a memory 320, a communications module 330, and/or a storage module 340. As illustrated, the foregoing example modules of the example computer device 300 are in communication over a bus 350.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computer device 300.

The communications module 330 allows the example computer device 300 to communicate with other computer or computing devices and/or various communications networks. For example, the communications module 330 may allow the example computer device 300 to send or receive communications signals. Communications signals may be sent or received according to one or more protocols or according to one or more standards. For example, the communications module 330 may allow the example computer device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the example computer device 300 to communicate using near-field communication (NFC), via Wi-Fi™, using Bluetooth™ or via some combination of one or more networks or protocols. In some embodiments, all or a portion of the communications module 330 may be integrated into a component of the example computer device 300. For example, the communications module may be integrated into a communications chipset. In some embodiments, the communications module 330 may be omitted such as, for example, if sending and receiving communications is not required in a particular application. The communications module may also, in some implementations, be referred to as a communications device, a communications interface, and/or a communications chip.

The storage module 340 allows the example computer device 300 to store and retrieve data. In some embodiments, the storage module 340 may be formed as a part of the memory 320 and/or may be used to access all or a portion of the memory 320. Additionally or alternatively, the storage module 340 may be used to store and retrieve data from persistent storage other than the persisted storage (if any) accessible via the memory 320. In some embodiments, the storage module 340 may be used to store and retrieve data in a database. A database may be stored in persistent storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access remotely stored data using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

When the computer device 300 is exemplary of the ambient commerce system 100 or, in at least some implementations, the electronic device 130, the computer device may include one or more sensors 360. The one or more sensors 360 may be or include any one or more of the sensors described above with reference to FIG. 1.

Figure 4:
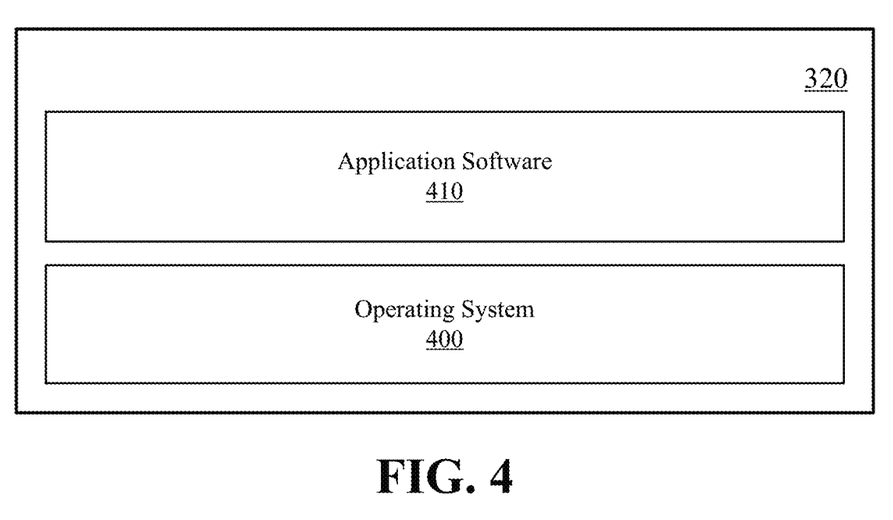
FIG. 4 shows a simplified organization of software components stored in a memory of the example computer device of FIG. 3.

FIG. 4 depicts a simplified organization of software components stored in the memory 320 of the example computer device 300 (FIG. 3). As illustrated, these software components include an operating system 400 and an application 410.

The operating system 400 is software. The operating system 400 allows the application 410 to access the processor 310 (FIG. 3), the memory 320, and the communications module 330 of the example computer device 300 (FIG. 3). The operating system 400 may be, for example, Google™ Android™, Apple™ iOS™, UNIX™, Linux™, Microsoft™ Windows™, Apple OSX™ or the like.

The application 410 adapts the example computer device 300, in combination with the operating system 400, to operate as a device performing a particular function. For example, the application 410 may cooperate with the operating system 400 to adapt a suitable embodiment of the example computer device 300 to operate as the ambient commerce system 100, the resource server 210 and/or the electronic device 130.

While a single application 410 is illustrated in FIG. 4, in operation the memory 320 may include more than one application 410 and different applications 410 may perform different operations.

Figure 5:
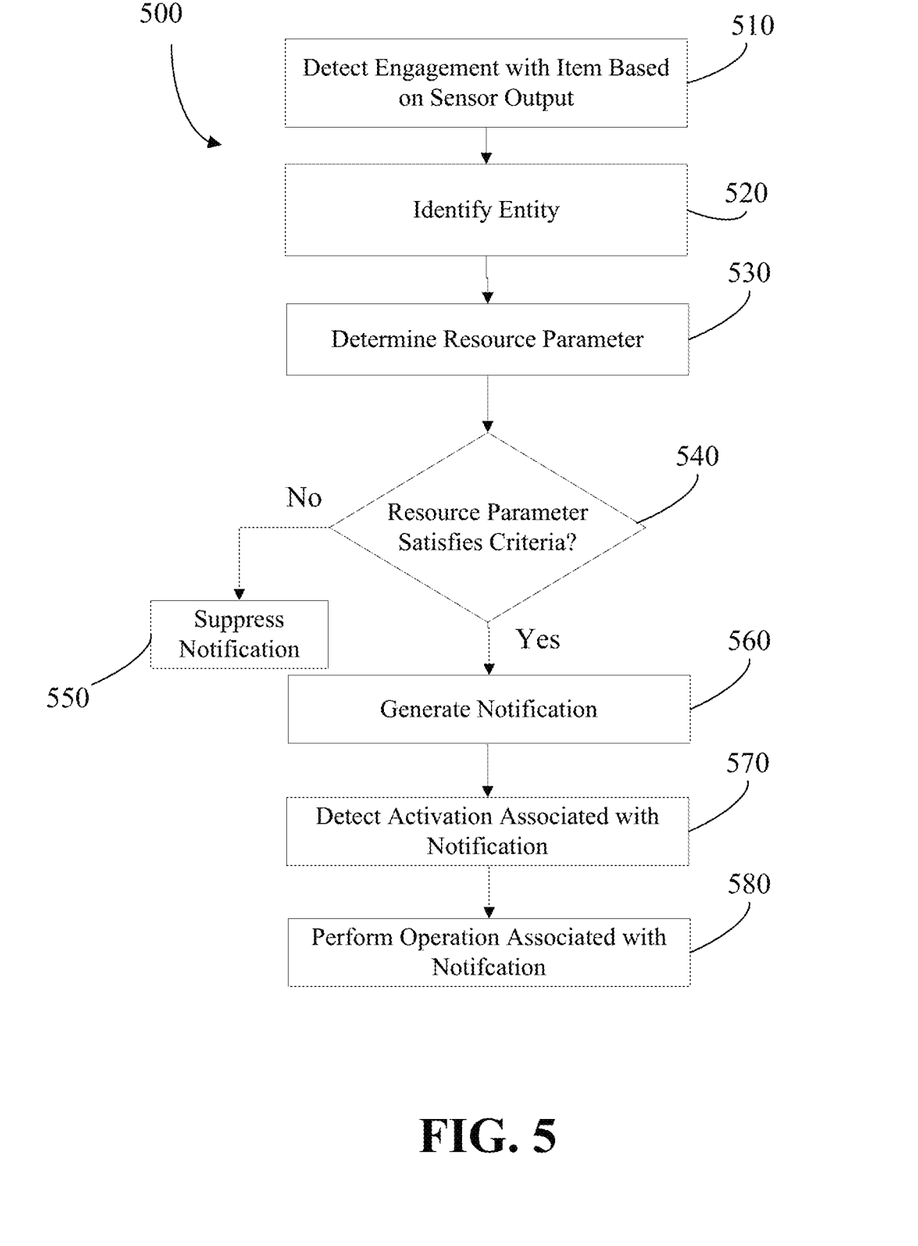
FIG. 5 is a flowchart showing operations performed by a computer system in providing a notification at an electronic device associated with an entity.

FIG. 5 is a flowchart showing operations performed by a computer system, such as the ambient commerce system 100 (FIGS. 1 and 2) and/or the resource server 210 (FIG. 2). The operations may be included in a method 500 which may be performed by the ambient commerce system 100 (FIGS. 1 and 2) and/or the resource server 210 (FIG. 2). For example, computer-executable instructions stored in memory of the ambient commerce system 100 (FIGS. 1 and 2) and/or the resource server 210 (FIG. 2) may, when executed by one or more processors of the ambient commerce system 100 (FIGS. 1 and 2) and/or the resource server 210 (FIG. 2), configure the ambient commerce system 100 (FIGS. 1 and 2) and/or the resource server 210 (FIG. 2) to perform the method 500 or a portion thereof.

At operation 510, the method 500 includes detecting, based on an output of one or more sensors at the ambient commerce premises, engagement of an entity with a first item satisfying first predetermined criteria. The sensors may be of the type described above with reference to FIG. 1. By way of example, in some implementations, the sensors may include a gaze detection sensor which identifies when the entity is looking at the first item. That is, engagement may be identified based on gaze. When the entity is looking at the first item, the system performing the method 500 may determine that the entity is engaged with the first item.

Other techniques for identifying engagement may also be used. By way of example, in some implementations, engagement with a first item may be determined to have occurred when a dwell of an entity is detected in a geofence for the first item. A dwell may be detected, for example, when it is determined that the entity is within the geofence and has not substantially moved for at least a threshold period of time. The threshold period of time may be a period of time that suggests that the entity is browsing; that is, contemplating a purchase. In other implementations, the dwell may be detected if it is determined that the entity has remained in the geofence for the restricted item for at least a threshold period of time. By way of example, the geofence may be or include a particular aisle or region or a portion thereof within an ambient commerce premises. The geofence may be an area of the ambient commerce premises in which items of a particular category or class are located. For example, example categories may include any one or a combination of: consumer electronics, televisions, sporting goods, bicycles, financeable products, clothing, grocery items, etc. In some instances, a dwell may be detected based on a sensor such as a camera 140*a*, 140*b*.

In another example of a technique that may be used to identify engagement with the first item, the ambient commerce system 100 may identify engagement with the first item when it detects that the entity has picked up the first item. The picking up of an item may be detected using a sensor output of a camera 140*a*, 140*b*, for example.

In another example of a technique that may be used to detect engagement with the first item, the ambient commerce system 100 may identify engagement with the first item when the first item is added to a shopping receptacle 170. The ambient commerce system 100 may identify that the first item has been added to a shopping receptacle 170 based on the output of a receptacle contents detector 146 and/or based on the output of a camera 140*a*, 140*b*.

In another example of a technique that may be used to detect engagement with the first item, the ambient commerce system 100 may identify engagement with the first item based on detected browsing activity of the entity with the first item. By way of example, engagement may be detected when the entity is determined to have examined a price tag for the item. By way of further example, engagement may be detected when the entity is determined to have contacted (e.g., touched) the item. These types of engagement may be detected based on the output of a camera 140*a*, 140*b*.

For a notification to be generated as will be described in the further operations of the method 500 below, the first item may need to be an item that satisfies predetermined criteria. The predetermined criteria may be based on a value parameter for the first item. The value parameter may be determined from a datastore 245. In some implementations, the predetermined criteria is determined to be satisfied by comparing the value parameter for the first item (i.e., the item that the entity is engaged with) to a defined threshold. For example, the predetermined criteria may be determined to be satisfied if the value parameter for the first item (i.e., the item that the entity is engaged with) exceeds a defined threshold. The threshold may, for example, require that the value of the first item be sufficiently high.

In another example, the first predetermined criteria may be determined to be satisfied when a class parameter associated with the first item corresponds to a defined class. The class parameter for the item may be obtained from a datastore 245. The class parameter may be a parameter of the type described above with reference to FIG. 2. By way of example, in one implementation, the class parameter may specify a category or type of the first item and the first predetermined criteria may be determined to be satisfied when the class parameter for the first item corresponds to a particular category; for example, televisions. In one particular example, it may be that the class parameter specifies whether the first item is a financeable item and the first predetermined criteria may be determined, by the system performing the method 500, to be satisfied when the first item is financeable.

The first predetermined criteria may, in some implementations, be determined to be satisfied when a brand parameter for the first item corresponds to defined brand criteria. For example, the first predetermined criteria may be determined to be satisfied when a brand parameter for the first item indicates that the brand of the item is a particular brand. In another example, the first predetermined criteria may be determined to be satisfied when a brand parameter for the first item indicates that the brand of the item is not a particular brand.

Other criteria may be evaluated instead of or in addition to the criteria defined above. Further, the first predetermined criteria may require multiple conditions to be satisfied. By way of example, it may be that the first predetermined criteria is only determined to be satisfied if a brand parameter for the first item (i.e., the item that the entity is engaged with) satisfies defined brand criteria and if a value parameter for the first item also satisfies defined value criteria. Or in another example, it may be that the first predetermined criteria is determined to be satisfied if a class parameter for the first item indicates that the first item is financeable and if a value parameter for the first item also satisfies defined value criteria; e.g., if the value is less than a threshold.

Referring still to FIG. 5, the method 500 may include, at operation 520, identifying the entity that is engaged with the first item. Identification of the entity may be performed using one or more of the identification techniques described above, particularly with reference to FIG. 1. By way of example, in some implementations, the identification may be performed using an identification sensor such as a biometric reader 144 or a token reader 142. By way of further example, identification may be performed using facial recognition, voice recognition, shared secret verification and/or detection of an electronic device 130 associated with the entity 120 at the ambient commerce premises. In some implementations, the identification operation 520 may be performed prior to the detection of engagement with the item at operation 510. For example, in some implementations, the identification operation 520 may be performed, in part, upon entry into the ambient commerce premises. Then, the system 200 such as the ambient commerce system 100 tracks that entity as they move through the ambient commerce premises. Such tracking may, for example, rely on the cameras 140a, 140b.

In some implementations, the identification of the entity 120 may be performed by or with data or processing resources associated with a resource server 210. For example, a resource server may include a representation of a voiceprint, fingerprint or face, or it may include a stored shared secret that is known to the entity 120 and that may be used to identify the entity.

At an operation 530, the system 200 performing the method 500 may determine a resource parameter for the identified entity. The resource parameter may be determined based on account data for the identified entity. That is the resource parameter may be a resource parameter that is associated with the specific entity that was identified. For example, the resource parameter may be retrieved from an account associated with the identified entity. The resource parameter may, in some implementations, be retrieved from or by the resource server 210. For example, the resource parameter may be retrieved from a datastore associated with the resource server 210 such as the database 235 of FIG. 2.

The resource parameter may be of a type described above; for example, with reference to FIG. 2. By way of example, in one implementation, the resource parameter may indicate whether the entity has access to a borrowed resource. The borrowed resource may, for example, be or represent credit, a loan, or a line of credit. In one implementation, the borrowed resource may be a buy now pay later feature.

In some implementations, the resource parameter may indicate a resource balance. By way of example, the resource parameter may indicate a balance of an account. The account may represent owned and/or borrowed resources. The resource balance may be expressed numerically.

Next, at an operation 540, the system 200 performing the method 500, such as the ambient commerce system 100, determines if the resource parameter satisfies defined criteria. The defined criteria may be referred to as second defined criteria or second predetermined criteria to distinguish such criteria from the criteria that the item may be evaluated against in the operation 510 (which may be referred to as first defined criteria or first predetermined criteria). In some implementations, the second predetermined criteria may determined to be satisfied when the resource parameter indicates that the entity has access to a borrowed resource. In some implementations, the second predetermined criteria may be determined to be satisfied based on a threshold. For example, the second predetermined criteria may be determined to be satisfied when the resource parameter indicates that the resource balance for the identified entity exceeds a threshold. In some implementations, the threshold may be determined based on a value parameter for the first item. For example, in one implementation, the second predetermined criteria may be determined to be satisfied if the resource balance exceeds an amount of resources required to transfer ownership of the item with which the entity is engaged.

In one implementation, the resource parameter indicates whether the entity may enable a buy now pay later feature to purchase the first item. If the resource parameter indicates that the entity may enable the buy now pay later feature, then the system 200 may determine that the second predetermined criteria is satisfied.

If the resource parameter does not satisfy the second predetermined criteria (as determined at the operation 540), a notification may be suppressed (i.e., not sent and/or generated) at an operation 550. When the resource parameter is determined to satisfy second predetermined criteria at the operation 540, the system 200, such as the ambient commerce system 100, may generate a notification on an electronic device associated with the entity.

In some implementations, the notification may be generated on the electronic device 130 associated with the entity 120 while the entity remains engaged with the item. For example, the notification may be generated on the electronic device associated with the entity while the entity remains in a geofence associated with the first item.

The notification is generated on an output interface of an electronic device 130 associated with the entity. The output interface may be or include a display or a speaker.

Figure 6:
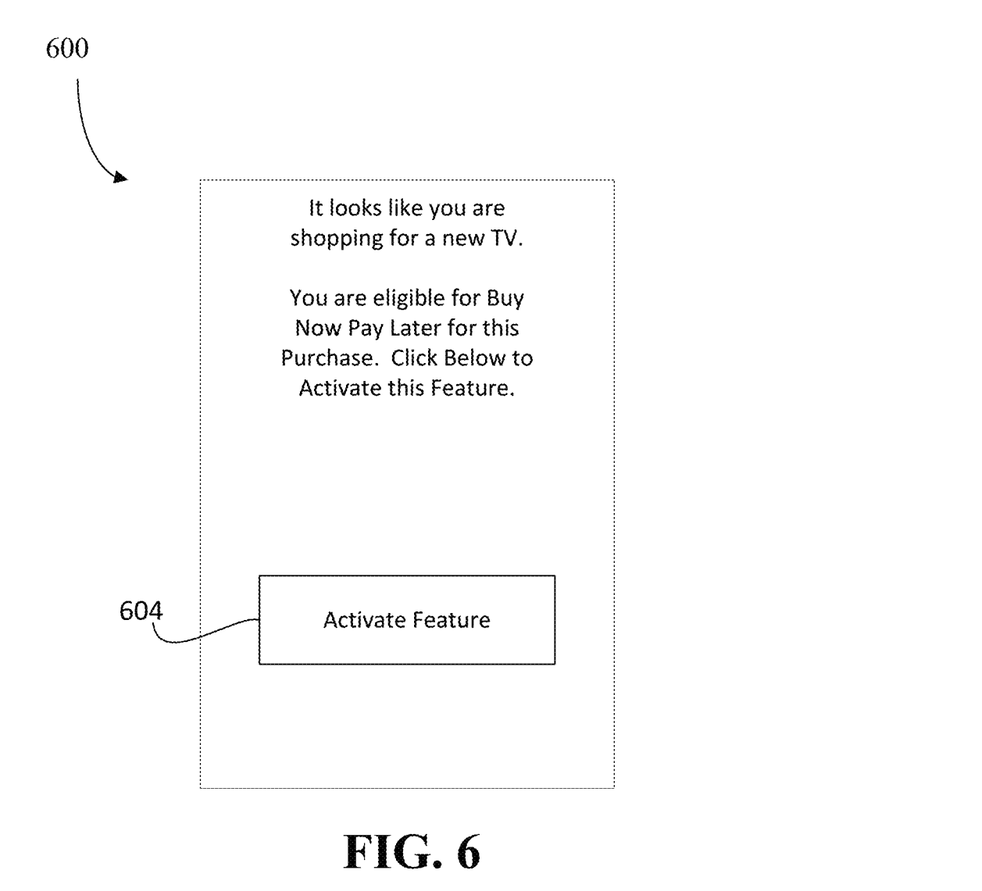
FIG. 6 is an example notification in accordance with example embodiments.

Referring briefly to FIG. 6, an example notification 600 is illustrated. The notification 600, in the example, is triggered when an entity is engaged with an item of a particular type; in the example, a television. Further, the example notification is triggered when it is determined, based on the account data for the particular entity, that the particular entity is eligible to use borrowed resources to transfer ownership of the item.

The notification 600 may, as illustrated in the example of FIG. 6, include a selectable option 604 to activate a feature based on the notification.

Referring again to FIG. 5, at an operation 570, the system 200, such as the ambient commerce system 100, may detect an activation associated with the notification. The activation may be an activation of the selectable option 604 to activate a feature based on the notification.

Next, at an operation 580, the system 200, such as the ambient commerce system 100, may perform an operation associated with the notification. For example, the system may activate a feature associated with the notification. By way of example, where the notification informs the entity that the ownership of the item may be transferred using borrowed resources, the system may activate the feature by updating a flag or other indicator associated with the entity's account to enable the feature. In some implementations, by activating the feature, a transaction or transfer may be processed upon checkout with the item that would otherwise be denied. For example, the resource server 210 may receive a transfer or transaction request for a transfer of resources to transfer ownership of the item and, when the feature is enabled, it may approve the transfer or transaction request whereas it would otherwise deny the transfer or transaction request.

In some implementations, the operation associated with the notification, once activated, allows the entity to leave the ambient commerce premises with the item without having to complete a traditional checkout process. In some implementations, if the notification were not activated, the system may prevent the entity from leaving the ambient commerce premises. For example, an electrically controlled exit prevention device such as an electrically controlled gate associated with an exit for the ambient commerce premises may be controlled to prevent the entity from leaving the ambient commerce premises with a particular item when the selectable option associated with the notification is not selected but to permit the entity to leave when the selectable option is selected. The electrically controlled gate may be, for example, an electrically controlled turnstyle. In this way, an electrically controlled exit prevention device may be selectively controlled based on whether the entity activated the notification; for example, using the selectable option 604.

Figure 7:
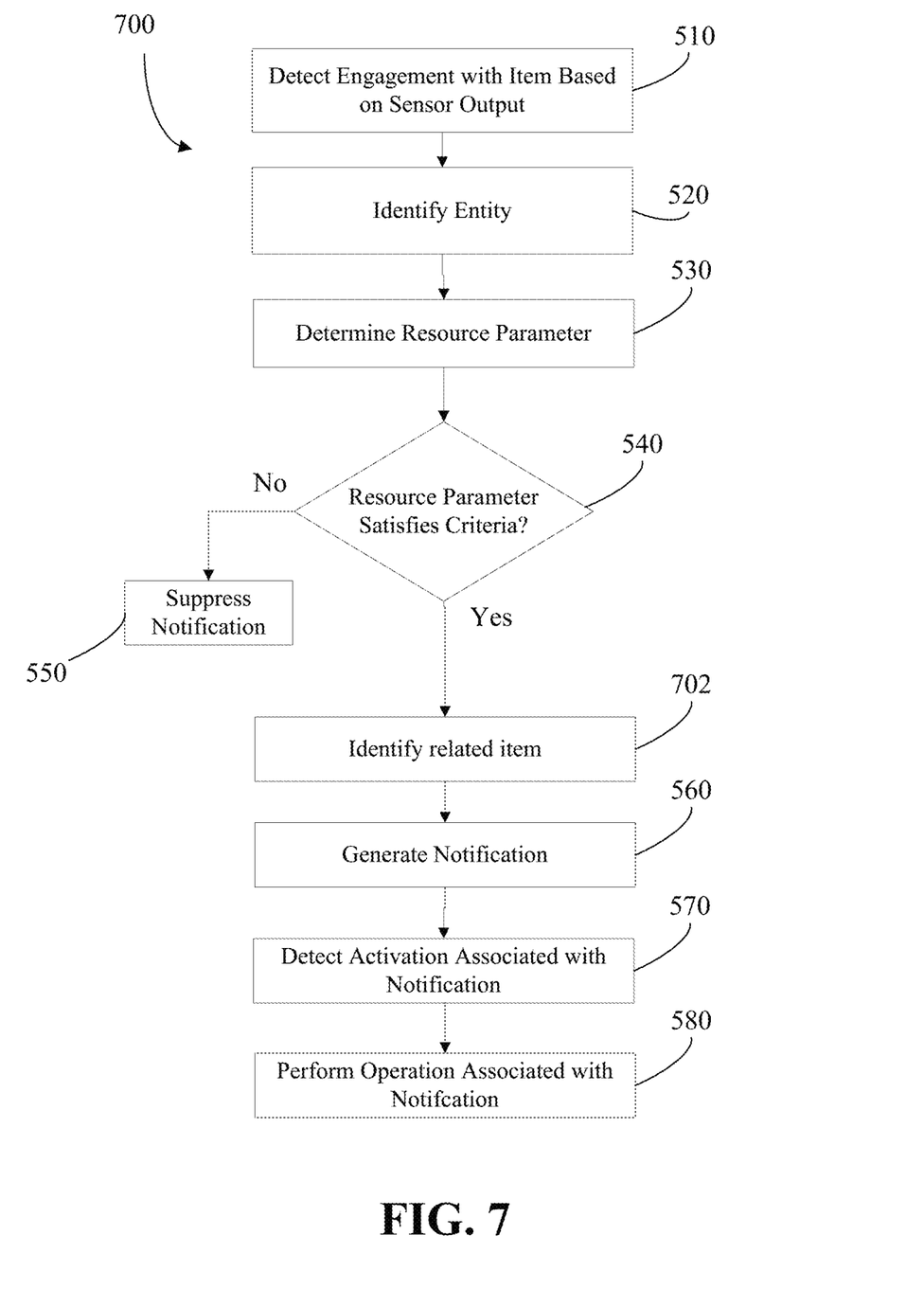
FIG. 7 is a flowchart showing operations performed by a computer system in providing a notification at an electronic device associated with an entity.

Referring now to FIG. 7, a further example method 700 is illustrated. FIG. 7 is a flowchart showing operations performed by a computer system, such as the ambient commerce system 100 (FIGS. 1 and 2) and/or the resource server 210 (FIG. 2). The operations may be included in a method 700 which may be performed by the ambient commerce system 100 (FIGS. 1 and 2) and/or the resource server 210 (FIG. 2). For example, computer-executable instructions stored in memory of the ambient commerce system 100 (FIGS. 1 and 2) and/or the resource server 210 (FIG. 2) may, when executed by one or more processors of the ambient commerce system 100 (FIGS. 1 and 2) and/or the resource server 210 (FIG. 2), configure the ambient commerce system 100 (FIGS. 1 and 2) and/or the resource server 210 (FIG. 2) to perform the method 700 or a portion thereof.

The method 700 of FIG. 7 may include many operations in common with the method 500 of FIG. 5 and the description of such operations will not be repeated at length. By way of example, the method 700 may include the operations 510, 520, 530, 540, 550, 560, 570, 580. However, the method 700 may also include, prior to generating the notification at the operation 560, identifying at an operation 702, from an item mapping database and based on the first item, a second item. The second item may, for example, be an alternative to the first item. By way of example, the alternative may be an item of a same type or class to the first item. The alternative may, for example, be associated with a different brand than the first item.

In another example, the second item may be an accessory for the first item. That is, the second item may be an item that is ordinarily used with and/or enhances the first item.

Figure 8:
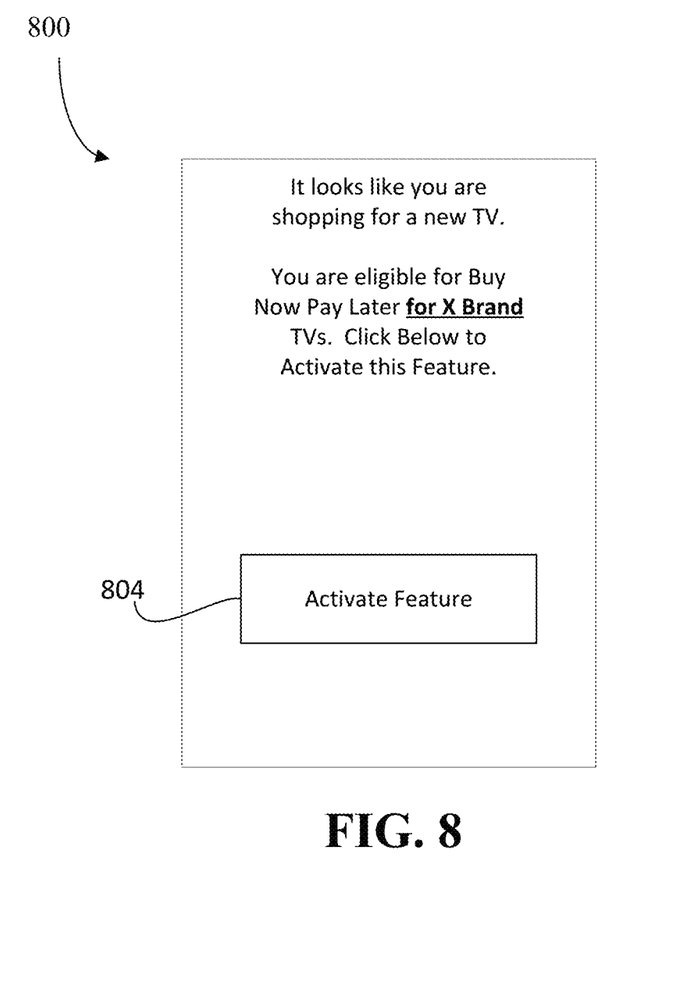
FIG. 8 is an example notification in accordance with example embodiments.
Figure 9:
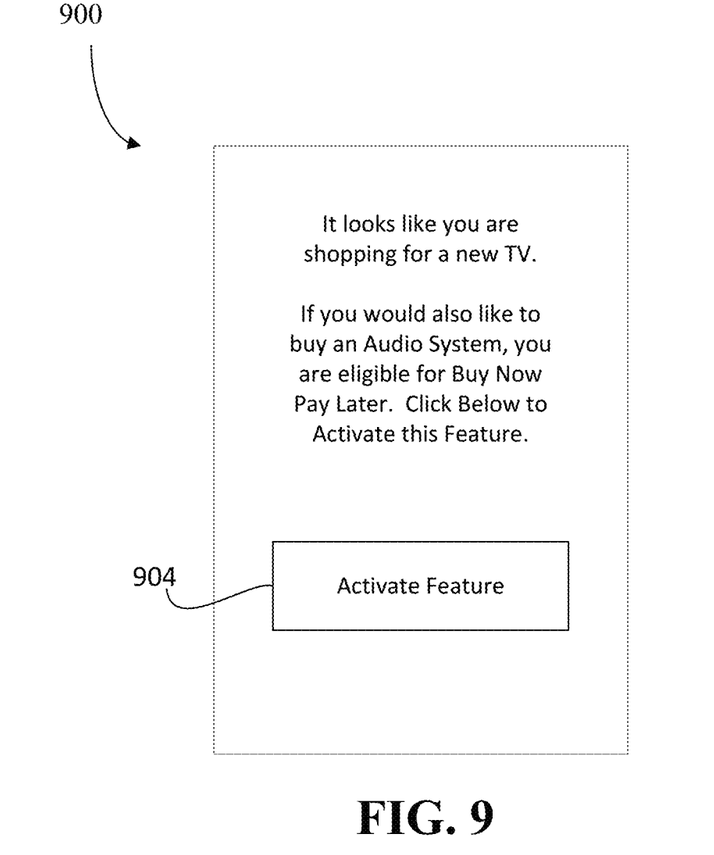
FIG. 9 is an example notification in accordance with example embodiments.

The notification that is generated at the operation 560 may then identify the second item. By way of example, example notifications 800, 900 are illustrated in FIGS. 8 and 9. Each of these notifications 800, 900 may include selectable options 804, 904 to activate a feature. These selectable options 804, 904 may be similar to the selectable option 604 of FIG. 6. The example notification 800 of FIG. 8 is triggered to suggest an entity consider an alternate item; in this example, a particular brand of item. The notification may allow a feature to be enabled if the entity opts to purchase the alternate item. The example notification 900 of FIG. 9 is triggered to suggest an entity consider an accessory item and the selectable option 904 enables a feature that is associated with the accessory item.

The methods described above may be modified and/or operations of such methods combined to provide other methods. For example, in some implementations, one of the first predetermined criteria and the second predetermined criteria may not be evaluated in some implementations. By way of example, in one implementation, a notification may be sent even if the first item does not satisfy the first predetermined criteria, provided the resource parameter satisfies the second predetermined criteria. By way of further example, in another implementation, a notification may be sent even if the resource parameter does not satisfy the second predetermined criteria as long as the first item satisfies the first predetermined criteria.

In another possible variation, it may be that the techniques described herein may be applied at systems that do not support ambient commerce. For example, the notification and feature enablement techniques described herein may be used on a system that does not, additionally, provide for a checkout-less experience.

Any examples involving a general purpose computer, aspects of this application transform the general-purpose computer into a special-purpose computing device when configured to execute the instructions described herein.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:
1. An ambient commerce system comprising:
 at least one camera sensor positioned at an ambient commerce premises, the ambient commerce premises including a merchant location;
 a receptacle contents detector configured to hold at least a first item;
 an identity sensor configured to determine an identity of an entity within the ambient commerce premises, the entity including a customer;
 an exit prevention device;

a processor in communication with the at least one camera sensor, the identity sensor, the exit prevention device, and the receptacle contents detector; and a memory coupled to the processor, the memory storing a plurality of processor-executable instructions which, when executed, cause the processor to:

track the entity throughout the ambient commerce premises with the at least one camera sensor;

detect, using the at least one camera sensor, an engagement of the entity with the first item, the engagement is based on a dwell of the entity in a geofence of the first item where the entity has not substantially moved for a threshold period and is detected with a gaze detection sensor;

identify the first item with the receptacle contents detector and determine whether a value parameter for the first item exceeds a defined threshold;

identify the entity with the identity sensor;

retrieve a resource parameter for the identified entity from a resource server, the resource parameter indicating access to at least one of: a borrowed resource and a resource balance;

when the resource parameter satisfies at least one of: access to the borrowed resource and the resource balance exceeds the value parameter for the first item, generate a notification on an electronic device associated with the entity, the notification generated on the electronic device associated with the entity while the entity remains in the geofence for the first item; and selectively control the exit prevention device responsive to an activation of the notification.

2. The ambient commerce system of claim 1, wherein the receptacle contents detector comprises at least one of: a barcode reader, a quick response code reader, and a wireless tag reader.

3. The ambient commerce system of claim 1, wherein the processor-executable instructions further cause the processor to:

determine when a class parameter associated with the first item corresponds to a defined class.

4. The ambient commerce system of claim 1, wherein the identity sensor comprises at least one of: a biometric reader and a token reader.

5. The ambient commerce system of claim 1, wherein the engagement is further based on at least one of: a contact between the entity and the first item, a gaze vector directed toward the first item, and an output of the receptacle contents detector.

6. The ambient commerce system of claim 1, wherein the processor-executable instructions further cause the processor to:

identify, from an item mapping database and based on the first item, a second item, and wherein the notification identifies the second item.

7. The ambient commerce system of claim 6, wherein the second item is an alternative to the first item.

8. The ambient commerce system of claim 6, wherein the second item is an accessory for the first item.

9. The ambient commerce system of claim 1, wherein identifying the entity with the identity sensor includes using image recognition and wherein the image recognition includes facial recognition.

10. A computer-implemented method comprising:

tracking an entity throughout an ambient commerce premises with at least one camera sensor, the ambient commerce premises including a merchant location and the entity including a customer;

detecting, using the at least one camera sensor, an engagement of the entity with a first item, the engagement based on a dwell of the entity in a geofence of the first item where the entity has not substantially moved for a threshold period and is detected with a gaze detection sensor;

identifying the first item with a receptacle contents detector;

determining whether a value parameter of the first item exceeds a defined threshold;

identifying the entity with an identity sensor;

retrieving a resource parameter for the identified entity from a resource server, the resource parameter indicating access to at least one of: a borrowed resource and a resource balance;

in response to the resource parameter satisfying at least one of: access to the borrowed resource and the resource balance exceeds the value parameter for the first item, generating a notification on an electronic device associated with the entity, the notification generated on the electronic device associated with the entity while the entity remains in the geofence for the first item; and selectively controlling an exit prevention device responsive to an activation of the notification.

11. The computer-implemented method of claim 10, wherein the receptacle contents detector comprises at least one of: a barcode reader, a quick response code reader, and a wireless tag reader.

12. The computer-implemented method of claim 10, wherein the method further comprises: determining when a class parameter associated with the first item corresponds to a defined class.

13. The computer-implemented method of claim 10, wherein the identity sensor comprises at least one of: a biometric reader and a token reader.

14. The computer-implemented method of claim 10, wherein the engagement is further based on at least one of: a contact between the entity and the first item, a gaze vector directed toward the first item, and an output of the receptacle contents detector.

15. The computer-implemented method of claim 10, further comprising:

identifying, from an item mapping database and based on the first item, a second item, and wherein the notification identifies the second item.

16. The computer-implemented method of claim 15, wherein the second item is an alternative to the first item.

17. The computer-implemented method of claim 10, wherein identifying the entity with the identity sensor includes using image recognition and wherein the image recognition includes facial recognition.

* * * * *